Nov. 10, 1959   D. S. CUEVAS   2,911,718
MELON-BALL FORMING DEVICE
Filed Oct. 14, 1957
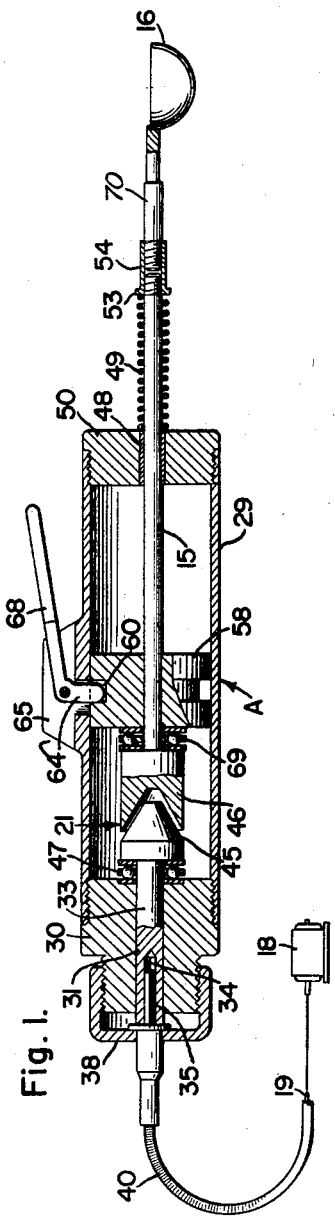
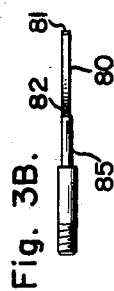
INVENTOR.
Daniel S. Cuevas
BY
Townsend and Townsend
Attorneys

United States Patent Office 2,911,718
Patented Nov. 10, 1959

2,911,718
MELON-BALL FORMING DEVICE

Daniel Salvador Cuevas, San Jose, Calif., assignor to Mariani Frozen Foods Corp., Santa Clara, Calif., a corporation of California Application October 14, 1957, Serial No. 690,053

1 Claim. (Cl. 30—272)

This invention relates to a tool to form balls from the meat of melons and more specifically to a device having a blade which may be inserted into the meat of a melon such as a cantaloupe, guavamelon or watermelon and while injected within the meat the device is arranged to rotate the blade throughout 360° to cut a ball-shaped piece of melon meat.

An object of this invention is to provide a manually manipulated apparatus having a substantially half round cutting element arranged to be inserted into the meat of a melon providing means to cause rotation of the cutting element while in the melon.

Another object of this invention is to provide a device in which there is provided a tool shaped to be manually manipulated and having a motor associated with said body for causing rotation of a cutting element carried by the tool and shaped to prescribe a spherical cut upon being rotated 360°.

Another object of this invention is to provide a simple, economical and portable apparatus having a cutting element adapted for insertion into the meat of a melon in which rotary motion is imparted to the cutting element through a main body portion of the apparatus held in the hand of an operator in which the main body portion is provided with a clutching mechanism which is operable to both engage and disengage the cutting element from a source of rotating force.

A feature and advantage of this invention is that the cutting element may be injected into the meat of the melon and thereafter the cutting element may be rotated without further manual shifting of the cutting element. By this means an operator may more efficiently cut melon balls than heretofore possible with existing melon-cutting equipment.

Other objects of the present invention will become apparent upon reading the following specification and referring to the accompanying drawing in which similar characters of reference represent corresponding parts in each of the several views.

In the drawings:

Fig. 1 is a cross-sectional view of a principal embodiment of the melon-cutting apparatus.

Fig. 2 is a perspective view of the melon-cutting apparatus of Fig. 1.

Fig. 3A is an enlarged side elevation of another embodiment of the cutting tool portion of the melon-cutting apparatus.

Fig. 3B is a front elevation of Fig. 3A.

The principal embodiment of the invention as viewed in Fig. 1 and Fig. 2 comprises a main body or housing indicated at A which is arranged in size and shape to be conveniently manually held in the hand of an operator. Body A rotatably supports a shaft 15 which mounts on one end a melon-cutting blade or spoon 16. A motor 18 is placed at a remote position from housing A and connected through a flexible cable 19 and a clutch mechanism 21 carried by body A so as to control the rotation of drive shaft 15.

To operate the device spoon or blade 16 is inserted into a melon B such as a cantaloupe, watermelon or guavamelon while clutch 21 is disengaged. After spoon 16 has been inserted into the melon, clutch mechanism 21 is actuated to cause the power from motor 18 to be transmitted to shaft 15 thus causing spoon 16 to be rotated. This causes spoon 16 to cut a round ball of melon meat.

In greater detail, body A comprises a cylinder 29 having a rear cap 30 threadably engaged with the rear end of the cylinder. Cap 30 is apertured as at 31 to provide a bearing for rotatably supporting a clutch pressure plate drive axle 33 disposed in axial alignment with shaft 15. Axle 33 is formed with a cable connector aperture in the rear end thereof, indicated at 34, into which the front portion 35 of cable 19 is inserted so as to impart rotary motion from cable 19 to the axle. Cable 19 is housed within a sheathing 40 and the sheathing is attached to a fitting 38 which is rigidly connected to the rear of cap 30 so as to maintain cable 19 and axle 33 in contact.

Clutch mechanism 21 comprises a male conical pressure plate 45 mounted on the forward end of shaft 33 and biased against cap 30. Roller bearings 47 are provided between pressure plate 45 and cap 30 to reduce impedance between the rear face of plate 45 and the front face of cap 30. A female conical pressure plate 46 is mounted on the rear end of rotatably and reciprocally mounted shaft 15 in axial registration with plate 45 so that when the shaft is slidably moved rearwardly plate 46 will be forced against plate 45 to frictionally engage the two plates together for transmission of torque between shaft 33 and shaft 15.

A forward portion of shaft 15 is slidably and rotatably supported by a bearing 48 carried by a front coverplate 50 and the rear portion of the shaft is guided and supported by a piston 58 similarly rotatably and slidably mounted to the shaft and slidably engaged with the bore of tube 29.

Clutch mechanism 21 is normally held in the disengaged position by a helical spring 49 mounted on the front end of shaft 15. One end of spring 49 is urged against the outer face of front coverplate 50 and the other end of spring 49 is urged against a collar 53 of a fitting 54 mounted on the end of shaft 15. Piston 58 is arranged as a throw out bearing to reciprocally move shaft 15 to engage and disengage plates 45 and 46. Roller bearings 69 are disposed between the rear face of piston 58 and the forward face of plate 46 to prevent frictional impedance between the piston and the rear face of plate 46 when clutch mechanism 21 is in the engaged position.

Piston 58 is controlled by a clutch control bell crank 64 pivotally mounted on a bracket 65 on the outer wall of tube 29. Bell crank 64 comprises an outer handle 68 by which the lever can be manually manipulated and a piston engaging tip 64 on the opposite end of the bell crank which rides in an annular groove 60 formed in piston 58. Depression of handle 68 thus results in the rearward movement of piston 58 and consequent engagement of clutch 21.

Spoon 16 is mounted on a shaft 70 the end of which is connected to shaft 15 by fitting 54. Shaft 70 is screwed into fitting 54 in axial alignment with shaft 15 so the spoon can be easily removed and replaced. This is an important feature where various cutting elements, blades or spoons are interchangeably employed.

Thus in operation it can be seen that motor 18 normally turns cable 19 thus causing shaft 15 to rotate. Normally spring 49 holds plate 46 away from plate 45 so that there is no force transmitted from the motor to shaft 15. Upon depressing handle 68 downwardly, piston 58 is moved rearwardly thus forcing plate 46 against plate 45. This causes frictional contact between the two plates 45 and 46 and rotation of shaft 15 and spoon 16.

Spoon 16 is formed in the shape of a hemisphere with a diameter of the spoon in axial alignment with shaft 15. The spoon, thus arranged, will describe an area constituting a complete sphere upon shaft 15 being rotated 360°. Thus a melon ball will be formed when spoon 16 is inserted into the meat of a cantaloupe and the spoon is rotated through 360°.

Referring now to Figs. 3A and 3B there is shown another embodiment of the spoon or cutting element. The modified cutting element includes a wire 80 formed to prescribe a half circle in cross-section. The opposite tip end portions 81 and 82 of the blade or cutting element are both arranged in axial alignment with a shaft 85 which is arranged to be mounted in fitting 54 in axial alignment with shaft 15. Thus rotating the blade 80 through 360° will cause the blade to describe an area constituting a sphere so that when blade 80 is inserted into a melon and rotated through 360° a melon sphere will be formed.

Although the foregoing invention has been described in some detail by way of illustration and example for purposes of clarity of understanding, it is to be understood that certain changes and modifications may be practiced within the spirit of the invention as limited only by the scope of the appended claim.

What is claimed is:

A tool for forming balls from melon meat comprising: a housing; a rotatably mounted shaft mounted on said housing; means to rotate said shaft through 360°; and a hemispherical blade mounted on and solely supported by the end of said shaft; said blade having a coplanar circular cutting edge disposed with the diameter of the cutting edge axially aligned with said shaft.

References Cited in the file of this patent

UNITED STATES PATENTS

| | | |
|---|---|---|
| 1,378,258 | Manderfield | May 17, 1921 |
| 1,668,198 | Ferdon | May 1, 1928 |
| 1,771,703 | Berill | July 29, 1930 |
| 2,540,397 | Lawrence et al. | Feb. 6, 1951 |
| 2,568,300 | Poplawski | Sept. 18, 1951 |
| 2,742,069 | Lum | Apr. 17, 1956 |